(12) United States Patent
Mishra et al.

(10) Patent No.: US 7,574,322 B2
(45) Date of Patent: Aug. 11, 2009

(54) AUTOMATED CLIENT DEVICE MANAGEMENT

(75) Inventors: Debi Prasad Mishra, Bellevue, WA (US); Brian R. Hall, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 249 days.

(21) Appl. No.: 11/126,028

(22) Filed: May 10, 2005

(65) Prior Publication Data

US 2006/0259809 A1    Nov. 16, 2006

(51) Int. Cl.
*G06F 11/30* (2006.01)
*G06F 11/00* (2006.01)

(52) U.S. Cl. .............. 702/182; 702/183; 702/184; 702/185; 702/188; 709/223; 709/224; 714/4

(58) Field of Classification Search ......... 702/182–189, 702/181, 190; 714/4; 709/203, 204, 223, 709/224

See application file for complete search history.

(56) References Cited

U.S. PATENT DOCUMENTS

2005/0081157 A1* 4/2005 Clark et al. ............. 715/736
2005/0267928 A1* 12/2005 Anderson et al. ........ 709/200

* cited by examiner

*Primary Examiner*—Eliseo Ramos Feliciano
*Assistant Examiner*—Phuong Huynh
(74) *Attorney, Agent, or Firm*—Lee & Hayes, PLLC (57) ABSTRACT

Automated client device management techniques are described. In an implementation, a method is described which includes collecting heuristic data from a plurality of client device over a network. The heuristic data describes a plurality of health considerations that include reliability, performance and security of the plurality of client devices. The collecting of the heuristic data is performed periodically and automatically without intervention from users of the plurality of client devices. A remedy is generated corresponding to an issue identified from the heuristic data regarding at least one of the health considerations that cures the issue and addresses one or more other health considerations indicated in the heuristic data.

12 Claims, 7 Drawing Sheets

AUTOMATED CLIENT DEVICE MANAGEMENT

TECHNICAL FIELD

The present invention generally relates to client devices and more particularly relates to automated client device management.

BACKGROUND

The complexity of client devices, such as desktop personal computers, personal digital assistants, and so on, is ever increasing, such as through increases in processing, memory and display resources of the client devices. Additionally, client devices may include hardware which in targeted for a wide variety of considerations. For instance, a desktop personal computer may have significant processing and memory resources for processing data, a personal digital assistant may include hardware devices which are configured to consume limited amounts of power for prolonged mobile use, a game console may be configured to provide a high-definition graphics, and so on. Further, each of these devices may include applications which are targeted for use on the particular hardware of these client devices. For example, a wireless phone may include applications configured to provide an output in a limited display area using minimal processing resources.

The ever increasing complexity and functionality of these client devices, however, has resulted in a corresponding increase in the complexity of maintaining the client devices. For example, it may increasingly difficult for the user to determine how to get updates for the variety of software utilized by the different client devices, protect against vulnerabilities of the client devices to attack from malicious parties, and to keep to client device performing in optimal condition by performing maintenance. Therefore, the client device may operate at less than optimal performance, which may even result in the user prematurely updating the client device.

Accordingly, there is a continuing need for improved techniques for client management.

SUMMARY

Automated client device management techniques are described. In an implementation, a method is described which includes collecting heuristic data from a plurality of client devices over a network. The heuristic data describes a plurality of health considerations that include reliability, performance and security of the plurality of client devices. The collecting of the heuristic data is performed periodically and automatically without intervention from users of the plurality of client devices. A remedy is generated corresponding to an issue identified from the heuristic data regarding at least one of the health considerations that cures the issue and addresses one or more other health considerations indicated in the heuristic data.

In another implementation, a method includes identifying an issue with at least one of a plurality of health considerations of a client device. The issue is identified using heuristic data that describes the plurality of health considerations, which include reliability, performance and security and the heuristic data is collected periodically and automatically over a network without intervention from users of a plurality of said client devices. A remedy is generated corresponding to the identified issue and an effect of the remedy on the client device is analyzed regarding the plurality of health considerations.

In an additional implementation, a method includes monitoring a plurality of health considerations of a client device which include reliability, performance and security and determining an overall health of the client device based at least on part on a comparison with heuristic data collected from a plurality of clients. A single indication of the overall health of the client device is output which does not include separate indications of one or more of the health considerations.

BRIEF DESCRIPTION OF THE DRAWINGS

The same reference numbers are utilized in instances in the discussion to reference like structures and components.

DETAILED DESCRIPTION

Overview

Today, users typically maintain their client devices (e.g., personal computers) by themselves, which has become an increasingly difficult task in light of performance, maintenance and safety aspects. This problem is further compounded in that most users are not interested in becoming familiar with the technology to address these issues. Therefore, the user's client device may suffer reliability problems associated with improper maintenance of the client device, may be subject to attack by malicious parties, may become prematurely "outdated" because the user has failed to install updates which are available for software on the client device or because the right "tweaking" of client device performance (e.g., disk defragmenting) was not timely applied, and so on.

In a variety of implementations, a client health service is described which may be utilized to proactively and reactively maintain a user's client device to ensure that it is "healthy". For example, the client health service may monitor a user's client device on an ongoing basis to identify vulnerabilities and reliability issues and then offer remedies that address these issues. Additionally, to help identify these client device "health" issues (e.g., performance, security and reliability) the client health service may collect heuristic data from the client device. Periodic maintenance functions may also be initiated by the client health service to provide an optimized computing environment for the user. Further, one or more of the implementations may provide baseline metrics that define what it means to be secure, reliable and perform as intended. These baseline metrics may be utilized in a variety of ways, such as for comparison of the client devices, one to another.

In the following discussion, an exemplary environment is first described which is operable to employ the client health service. Exemplary procedures are then described which may be utilized in the exemplary environment, as well as in other environments.

Exemplary Environment

Figure 1:
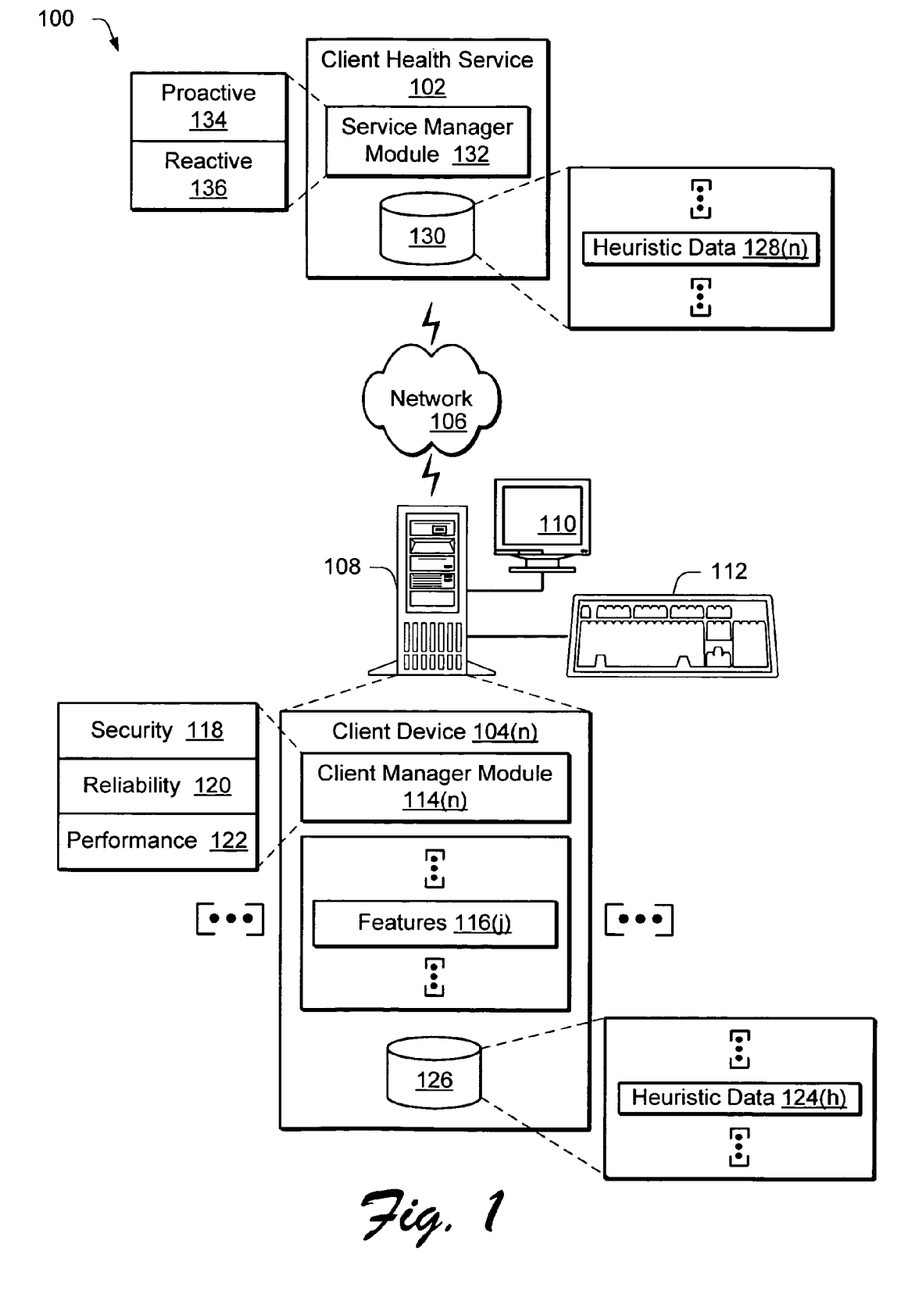
FIG. 1 is an illustration of an environment in an exemplary implementation that is operable to employ techniques for automated client device management.

FIG. 1 is an illustration of an environment 100 in an exemplary implementation that is operable to employ techniques for automated client device management. The illustrated environment 100 includes a client health service that is communicatively coupled to a plurality of client devices 104(n), where "n" can be any integer from one to "N", over a network 106. The client devices 104(n) may be configured in a variety of ways for network access. For example, one or more of the client devices 104(n) may be configured as a computing device, such as a desktop computer 108 having a display device 110 and an input device (which is illustrated as a keyboard 112), a mobile station, an entertainment appliance, a set-top box communicatively coupled to a display device, a wireless phone, a game console, and so forth. Thus, the client devices 104(n) may range from full resource devices with substantial memory and processor resources (e.g., personal computers, game consoles) to low-resource devices with limited memory and/or processing resources (e.g., traditional set-top boxes, hand-held game consoles). Further discussion of an exemplary client device 104(n) configured as a computing device in a distributed environment may be found in relation to FIG. 7.

Although the network 106 is illustrated as the Internet, the network may assume a wide variety of configurations. For example, the network 106 may include a wide area network (WAN), a local area network (LAN), a wireless network, a public telephone network, an intranet, and so on. Further, although a single network 106 is shown, the network 106 may be configured to include multiple networks.

The client device 104(n) is illustrated as including a client manager module 114(n) which is executable to monitor operation of a plurality of features 116(j), where "j" can be any integer from one to "J". For example, the plurality of features 116(j) may be provided through execution of software by the client device 104(n), such as applications, drivers, and other executable modules. The features 116(j) may be monitored to determine overall health of the client device 104(n) (i.e., suitability to perform desired tasks) based on a plurality of health considerations. Additionally, one or more of the features 116(j) may be provided by hardware and may also be monitored, such as through memory scans, disk health, network throughput and reliability, operation of peripheral devices, and so on, further discussion of which may be found in relation to FIG. 2.

The client manager module 114(n), for instance, may monitor security 118, reliability 120 and performance 122 of the client device 104(n). Security 118 may relate to a variety of security related considerations, such as viruses, spyware, and so on, which affect the health of the client device 104(n). Reliability 120 considerations may involve the ability of the features 116(j) of the client device 104(n) to perform as desired under expected conditions for an amount of time. Reliability 120 may be expressed in a variety of ways, such as mean time between failures. For a personal computer, for instance, reliability may be expressed as a number of crashes, "hanging" (e.g., freezing) of the personal computer, number of application malfunctions during a given period of time, and so on. Reliability for the personal computer may also be expressed at a component level, such as number of disk read/write failures, frequency of network connection device failures, and so on.

Performance 122 relates to the efficiency of the features 116(j) in performing the desired tasks, and may be expressed in a variety of ways based on the feature being described, such as an amount of time needed to render a page by a display device, amount of time needed to startup or shutdown a device, amount of time to begin application execution, and so forth. Additionally, performance may also be expressed at a component level, such as an amount of time to write data to memory, transfer data using a network connection device, and so on. These examples are not exhaustive, and therefore a variety of other health considerations may also be monitored through execution of the client manager module 114(n) without departing from the spirit and scope thereof.

The client manager module 114(n) may also be executed to store a plurality of heuristic data 124(h), where "h" can be any integer from one to "H", in storage 126 on the client device 104(n) which describe the monitoring. For example, the heuristic data 124(h) may describe the security 118 health considerations, such as virus protection software employed by the client device 104(n) and version of virus definitions employed by that software, if spyware is included on the client device 104(n), and if so, the effects of that software, sources of software that is downloaded to the client device 104(n), and so on. Additionally, the heuristic data 124(h) may also describe reliability 120 health considerations of the client device 104(n), such as which devices (e.g., processors, memory, output devices, input devices, network connection devices, and so forth) are included on the client device 104(n) and how often each of the devices fails to provide its corresponding functionality, errors encountered in the execution of software on the client device 104(n), and so on. Further, the heuristic data 124(h) may also described performance 122 health considerations, such as operational parameters of hardware devices, speed in the execution of software on the client device 104(n), and so on. Thus, the heuristic data 124(h) may describe the overall health of the client device 104(n).

Each of the client manager modules 114(n) may also be executed to communicate (e.g., using a "push" technique) the heuristic data 124(h) as monitored across the network 106 for storage by the client health service 102 as heuristic data 128(n) in storage 130. The communication may also be performed in a variety of other ways, such as by following a "pull" communication technique. Thus, the client health service may obtain heuristic data 128(n) which describe security 118, reliability 120 and performance 122 of each of the plurality of client devices 104(n).

The client health service 102 is illustrated as including a service manager module 114(n). The service manager module 132 is executable to utilize the plurality of heuristic data 128(n) to maintain the health of the plurality of client devices 104(n). The heuristic data 128(n) may be utilized in a variety of ways. For example, the service manager module 132 may be proactive 134 and control health issues of the plurality of client devices 104(n) before they occur, such as by performing preventative maintenance (e.g., defragmenting a hard disk drive). The service manager module 132 may also be reactive 136 to cure health issues that have occurred. For instance, a service manager module 132 may detect an issue with one or more of the plurality of features 116(j) that has occurred and perform one or more actions to cure the issue. Additionally, the service manager module 132 may be both reactive and proactive, such as by detecting an issue with one of the plurality of client devices 104(n) that has occurred and curing that issue for another one of the plurality of client devices 104(n). For example, the heuristic data may be harvested and analyzed to determine what has happened on a subset of the client devices 104(n) to decide what proactive measures, if any, should be applied across the network 106 to each of the plurality of client devices 104(n). Further discussion of the operation of the client manager module 114(n) and the service manager module 132 may be found in relation to the following figure.

Another dimension to centralized management of a plurality of features of the client device 104(n) is that in some scenarios, the various features may have an impact on each another. For example, an anti-spyware feature may catch applications that cause performance degradation or that policies (e.g., such as black-list or white-list) may be shared between different features.

Generally, any of the functions described herein can be implemented using software, firmware (e.g., fixed logic circuitry), manual processing, or a combination of these implementations. The terms "module" and "logic" as used herein generally represent software, firmware, or a combination of software and firmware. In the case of a software implementation, the module, functionality, or logic represents program code that performs specified tasks when executed on a processor (e.g., CPU or CPUs). The program code can be stored in one or more computer readable memory devices, further description of which may be found in relation to FIG. 2. The features of the management techniques described below are platform-independent, meaning that the techniques may be implemented on a variety of commercial computing platforms having a variety of processors.

Figure 2:
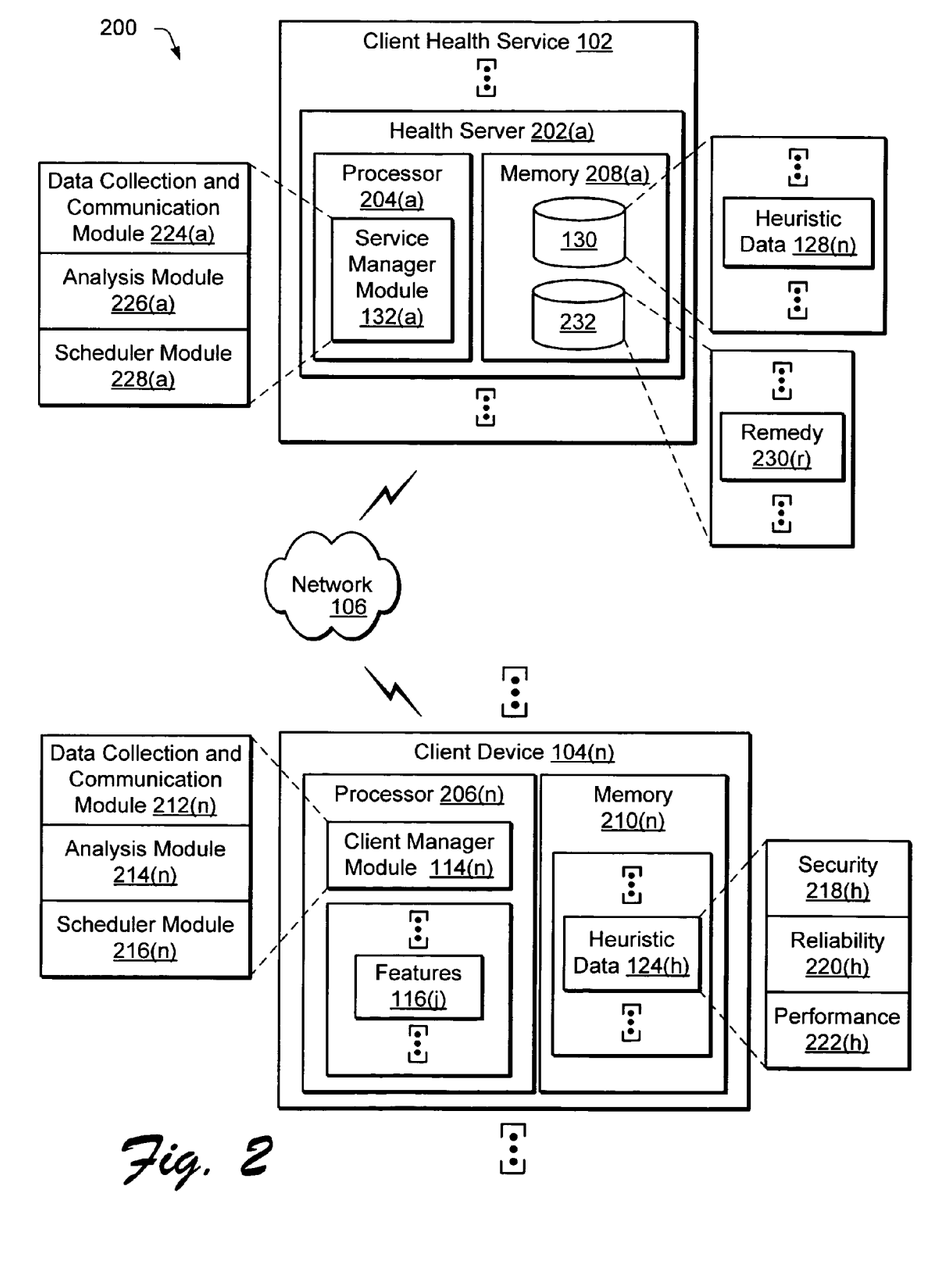
FIG. 2 is an illustration of a system in an exemplary implementation showing a client health service and a client device of FIG. 1 in greater detail.

FIG. 2 is an illustration of a system 200 in an exemplary implementation showing the client health service 102 and the client device 104(n) of FIG. 1 in greater detail. The client health service 102 is illustrated as being implemented by a plurality of health servers 202(a), where "a" can be any integer from one to "A". Further, the plurality of health servers 202(a) and the plurality of client devices 104(n) are illustrated as including a respective processor 204(a), 206(n) and a respective memory 208(a), 210(n). The service manager module is illustrated in FIG. 2 as "service manager module 132(a)" to indicate that each of the plurality of health servers 202(a) may include a corresponding service manager module 132(a).

Processors are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions. Alternatively, the mechanisms of or for processors, and thus of or for a computing device, may include, but are not limited to, quantum computing, optical computing, mechanical computing (e.g., using nanotechnology), and so forth. Additionally, although a single memory 208(a), 210(n) is shown, respectively, for each of the health servers 202(a) and the clients 104(n), a wide variety of types and combinations of memory may be employed, such as random access memory (RAM), hard disk memory, removable medium memory, and so forth.

The service manager module 132(a) and the client manager module 114(n) may cooperate to provide a "closed-loop" system that provides ongoing monitoring of client device 104(n) performance, reliability and security and may take steps to address issues which relate to one or more of these health considerations. For example, the client manager module 114(n) and the service manager module 132(a) may provide ongoing monitoring of vulnerabilities such as data loss, privacy intrusion, viruses, spyware and other intrusions and deal with theses issues timely and proactively before a decrease in any of these health considerations is noticeable to a user of the client device 104(n). Additionally, the service manager module 132(a) and the client manager module 144(n) may perform regularly scheduled "tune-up" and "oil-change" types of maintenance to keep the client device 104(n) "healthy", i.e., operating as intended. By doing these kinds of proactive maintenance, hassles typically encountered by a user today may be eliminated, thereby improving user satisfaction with the client device 104(n).

The client manager module 114(n) is illustrated as being executed on the processor 206(n) and is storable in memory 210(n) of the client device 104(n). The client manager module 114(n), when executed, may provide a variety of functionality. For example, the client manager module 114(n) may include a data collection and communication module 212(n), an analysis module 214(n) and a scheduler module 216(n). The data collection and communication module 212(n) is representative of functionality of the client manager module 114(n) for collecting and communicating the plurality of heuristic data 124(h). For example, the data collection and communication module 212(n) may monitor operation of the plurality of features 116(j) of the client device 104(n) (which are illustrated as software being executed on the processor 206(n) in this example but may also include other hardware features) and store heuristics which describe security 218(h), reliability 220(h), and performance 222(h) of those features. The data collection and communication module 212(n) may then communicate this data to the client health service 102, such as by "pushing" the heuristic data 124(h) over the network 106 to the client health service 102 at periodic intervals, whenever a network connection is obtained, and so on.

The client manager module 114(n) is also illustrated as including an analysis module 214(n) which is representative of functionality which may analyze the plurality of heuristic data 124(h). This analysis may be performed in a variety of ways. For example, the analysis module 214(n) may note trends in the heuristic data 124(h) and identify issues with security 218(h), reliability 220(h) and/or performance 222(h) based on deviations from those trends, general direction of the trends (e.g., gradual decrease in performance), and so on. In another example, the analysis module 214(n) may examine the heuristic data 124(h) collected from monitoring operation of the client device 104(n) with heuristics obtained from other clients. For instance, the client manager module 114(n) may receive heuristic data 128(n) from the client health service 102 which describe the operation of other clients in the plurality, and utilize this information to determine whether the client device 104(n) is "healthy". A variety of other analysis examples are also contemplated.

The results of the analysis module 214(n) may also be output for viewing by a user of the client device 104(n). For example, the analysis module 214(n) may utilize the security 218(h), reliability 220(h) and performance 222(h) health considerations to determine a state of overall health of the client device 104(n). This state may then be reflected utilizing a single indication such that the user can be informed as to the overall health of the client device 104(n) without having to sort through specific details of how this health is determined. Further discussion of the single indication may be found in relation to FIGS. 3 and 6.

The client manager module 114(n) is further illustrated as including a scheduler module 216(n). The scheduler module 216(n) is representative of functionality for scheduling tasks to be performed by the client manager module 114(n). For example, the schedule module 216(n) may be utilized to schedule proactive maintenance tasks of the client device 104(n), such as to update virus libraries, defragment a disk drive, update drivers, remove unused icons from a desktop, check for software updates, and so on. The scheduler module 216(n) may also be utilized to schedule communication of the heuristic data 124(h) from the client device 104(n) to the client health service 102.

The service manager module 132(a) is also illustrated as including a data collection and communication module 224(a), an analysis module 226(a), and a scheduler module 228(a) which may be the same as or different from the modules included in the client manager module 114(n) of the client device 104(n). For example, the data collection and communication module 224(a) may be executable to obtain heuristic data 124(h) from each of the client devices 104(n), aggregate the collected heuristic data 128(n), and send the aggregated heuristic data 128(n) to each of the client devices 104(n). Thus, in this way the analysis module 214(n) of each of the client device 104(n) may be informed as to the operation of the plurality of client devices.

In another example, the heuristic data 128(n) is not communicated "back down" to the client devices 104(n), but rather is analyzed by the analysis module 226(a) to determine if any client device health related issues have or are likely to occur. Based on this analysis, the analysis module 226(a) may generate one or more of a plurality of remedies 230(r), where "r" can be any integer from one to "R", which are illustrated in FIG. 2 as included in storage 232 in the memory 208(a). One or more of the remedies 230(r) may then be communicated over the network 106 to the client devices 104(n) to "cure" the identified issue, further discussion of which may be found in relation to FIG. 4. In a further example, analysis is performed by both analysis modules 214(n), 226(a).

The scheduler module 228(a) of the service manager module 132(a) may also be executed to schedule a variety of tasks. For example, the scheduler module 228(a) may be executed to schedule a period of time for communication of the remedies 230(r) to particular client devices 104(n). The scheduler module 228(a) may also be executed to schedule when the data collection and communication module 224(a) collects heuristic data 124(h) from the plurality of client devices 104(n). Further, the scheduler module 228(a) may schedule when the analysis module 226(a) is to analyze the plurality of heuristic data 128(n). A variety of other examples are also contemplated.

Thus, the client health service 102, through communication of the client manager module 114(n) and the service manager module 132(a) may provide a wide range of functionality. For instance, the modules may provide proactive monitoring "24×365" and take preventative steps as needed, provide comprehensive and automated remedies for identifying client health related issues, may generate and implement the remedies automatically and without intervention by a user of the client device 104(n), may be tailored to a specific configuration of the client device 104(n), may communicate "peace-of-mind" to a user of the client device 104(n), provide an extensible and generic service-delivery platform that performs support functions, perform statistics collection and harvest to maintain the client devices 104(n), and so on. Further, the modules may provide logic to combine different client health services to provide a "higher level" of service, such as by recovering backup copies of infected files automatically. Further discussion of this functionality may be found in relation to FIGS. 3-6.

Figure 3:
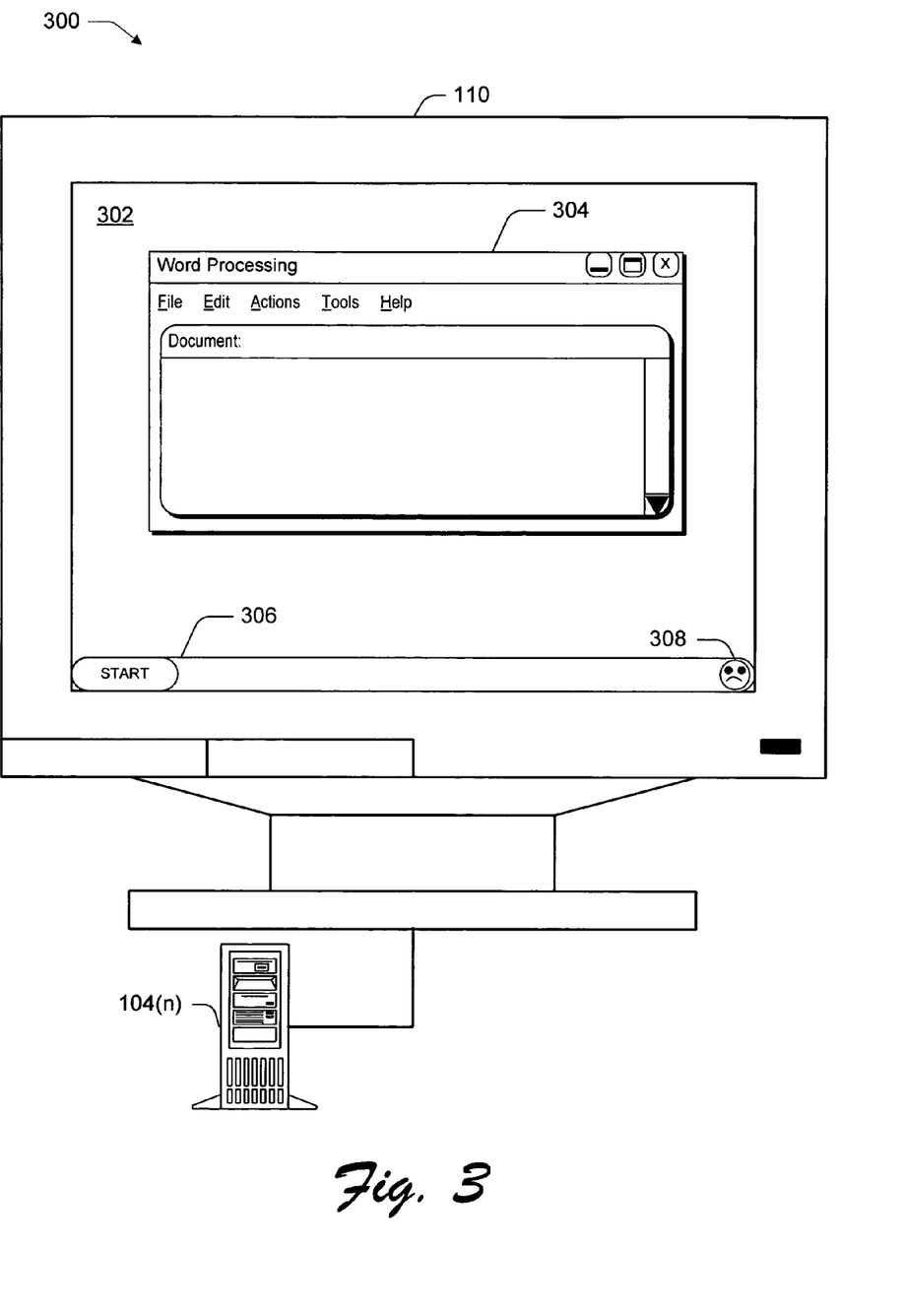
FIG. 3 is an illustration of an exemplary implementation in which a display device of FIG. 1 is shown as outputting a single indication which represents the overall health of a client device in a user interface.

FIG. 3 is an illustration of an exemplary implementation 300 in which the display device 110 of FIG. 1 is shown as outputting a single indication which represents the overall health of a client device in a user interface. The display device 110 includes a display area 302 which includes a display of a word processing 304 user interface and a task bar 306. The task bar 306 may be a "locked" or "pop-up" task bar which includes a single indication 308 of the overall health of the client device 104(n).

The illustrated single indication 308 is shown as a frowning face, which in this instance indicates that the overall health of the client device 104(n) is not good. Thus, the single indication 308 may provide an indication of overall health of the client device 104(n) that is readily apparent to even a novice user and which "hides" the details of the health considerations utilized to arrive at the overall health determination. In an implementation, the single indication 308 is selectable to cause an output of these health considerations (e.g., reliability, performance, security, and so on) so that a user desiring such specificity may obtain it. Further discussion of the single indication may be found in relation to FIG. 5.

Exemplary Procedures

The following discussion describes automated management techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to the environment 100 of FIG. 1 and the system 200 of FIG. 2.

Figure 4:
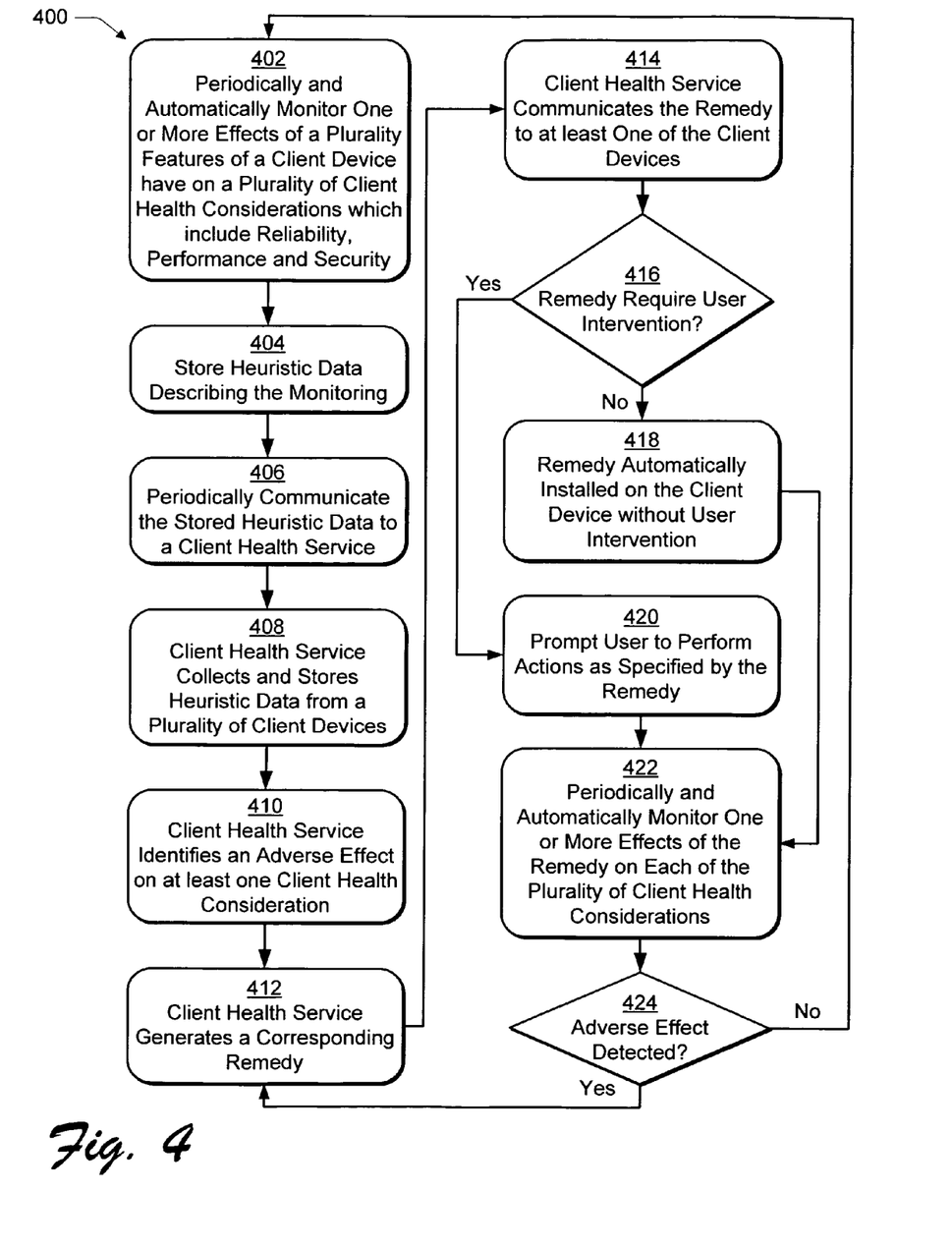
FIG. 4 is a flow chart depicting a procedure in an exemplary implementation in which heuristic data obtained from monitoring a plurality of client devices is utilized to generate a remedy to an identified issue, which is then monitored to determine the effect of the remedy on the client devices.

FIG. 4 is a flow chart depicting a procedure 400 in an exemplary implementation in which heuristic data obtained from monitoring a plurality of client devices is utilized to generate a remedy for an identified issue, which is then monitored to determine the effect of the remedy on the client device. One or more effects of a plurality of features of a client device have on a plurality of client health considerations which include reliability, performance and security are periodically and automatically monitored (block 402). For example, the client manager module 114(n) may be executed to monitor the execution of a spyware monitoring program and determine the effect of the program on other software being executed on the client device 104(n). The monitoring may be performed periodically as scheduled by the scheduler module 216(n), continuously, and so on.

Heuristic data which describes the monitoring is stored (block 404). For instance, the data collection and communication module 212(n) may store the heuristic data 124(h) locally on the client device 104(n). The stored heuristic data is then periodically communicated to the client health service 102 (block 406). Again, for instance, the scheduler module 216(n) may schedule a period interval, during which, the heuristic data 124(h) is to be communicated over the network 106 to the client health service 102. In another instance, the scheduler module 228(a) may schedule a different respective time for each for the plurality of client devices 104(n) to transmit the heuristic data 124(h). A variety of other instances are also contemplated without departing from the spirit and scope thereof.

Accordingly, the client health service collects and stores heuristic data from a plurality of client devices (block 408). The client health service may then identify an adverse effect on at least one client health consideration (block 410) by analyzing the collected heuristic data. For instance, the client health service 102 may execute an analysis module 226(a) which indicates that a particular feature 116(j) being executed on a subset of the client devices 104(n) causes a significant decrease in performance of the client devices 104(n). The client health service may then generate a corresponding remedy (block 412) that addresses the adverse effect. For instance, the client health service 102 may generate a patch which causes the spyware monitoring application previously described to increase the amount of time between examining the client device 104(n) for spyware. The client health service then communicates the remedy to at least one of the client devices (block 414). For instance, the remedy may be targeted to client devices which have experienced the adverse effect of the spyware monitoring application on client health. In another instance, the remedy may be targeted to each client device having the spyware monitoring application, thereby proactively curing the adverse effect even before the effect is experienced by the client device.

A determination is made as to whether the remedy requires user intervention (decision block 416). If not ("no" from decision block 416), then the remedy is automatically installed on the client device without user intervention (block 418). Thus, in such an instance a user of the client device does not need to even be aware that the remedy was installed. If the remedy does require user intervention ("yes" from decision block 416), the user is prompted to perform actions as specified by the remedy (block 420). For instance, the remedy may be configured to "step" the user of the client device through the actions that need to be performed such that even a novice user with little training can install the remedy.

After installation of the remedy, one or more effects of the remedy on each of the plurality of client health considerations is periodically and automatically monitored (block 422). For instance, a remedy installed that addresses performance client health consideration (e.g., overly aggressive monitoring by the spyware application) may monitor the effect of the remedy on other client health considerations, such as reliability and security. In this way, the effect of the remedy on the overall health of the client device is determined, and not just for the health consideration originally being addressed. A determination is again made as to whether an adverse effect is detected (decision block 424). If not ("no" from decision block 424), the procedure 400 returns to monitoring of the client device (block 402). If an adverse effect is detected ("yes" from decision block 424), the client health service again generates a corresponding remedy (block 412) and a portion of the procedure is repeated (e.g., blocks 414-424). In this way, the client health service 102 may provide proactive monitoring and comprehensive and automated solutions for addressing issues with client health considerations.

Although the procedure 400 of FIG. 4 described analysis as being performed by the client health service 102, the analysis may be performed in a variety of different ways. For instance, the heuristic data collection from the plurality of clients 104(n) may be communicated to each client to perform the analysis through execution of a respective analysis module 214(n). In another instance, the analysis is performed by both analysis modules 226(a), 214(n). A variety of other instances are also contemplated.

Figure 5:
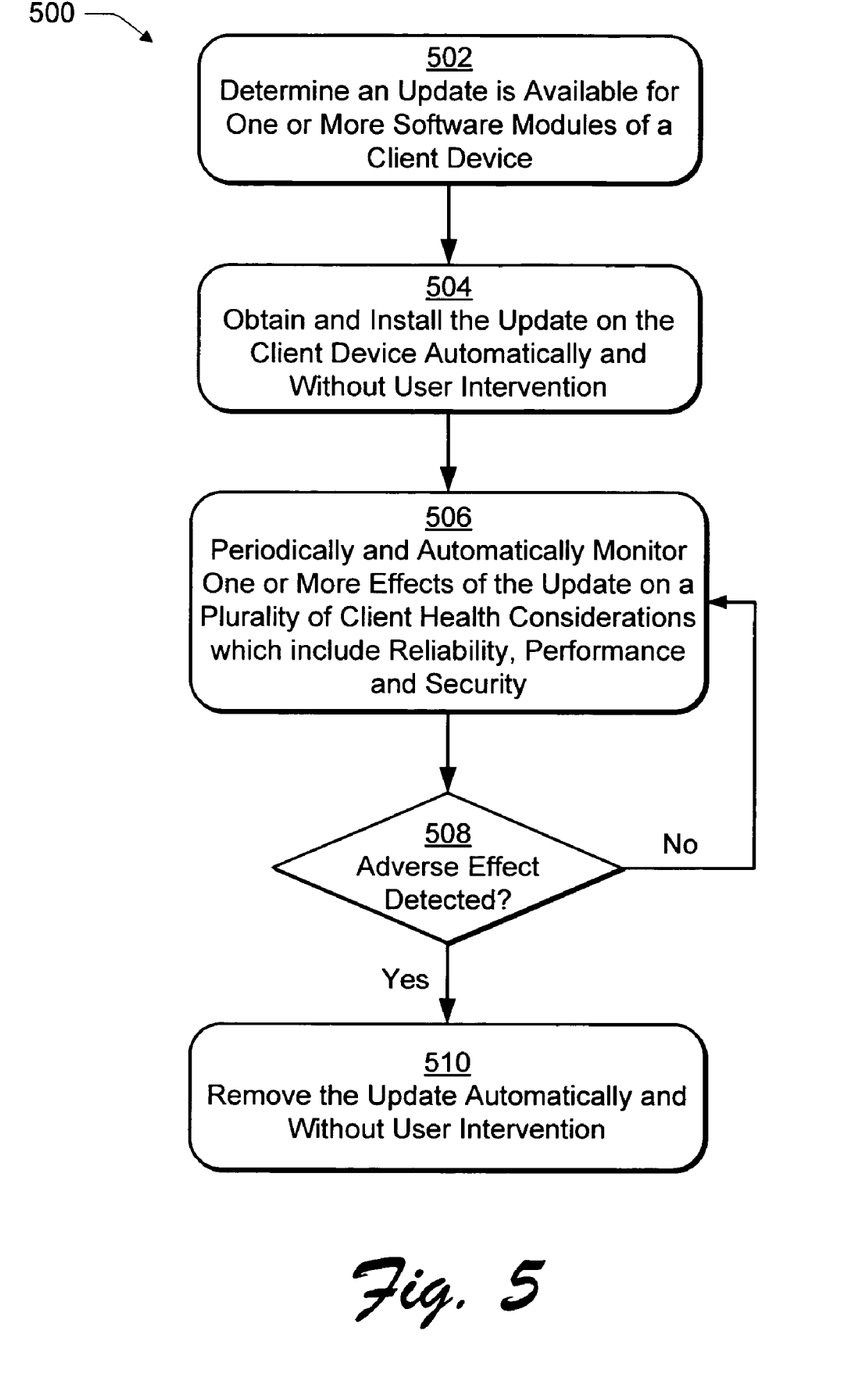
FIG. 5 is a flow diagram depicting a procedure in an exemplary implementation in which an effect of an update on a client device is monitored for client health considerations which include performance, reliability and security.

FIG. 5 is a flow diagram depicting a procedure 500 in an exemplary implementation in which an effect of an update on a client device is monitored for client health considerations which include performance, reliability and security. A determination is made that an update is available for one or more software modules of a client device (block 502). For example, a data collection and communication module 224(a) may be executed according to times specified by the scheduler module 228(a) to check for updates for software modules located on the client device 104(n).

The update is obtained and installed on the client device automatically and without user intervention (block 504). For example, the service manager module 132(a) may communicate the update to the client device 104(n) for installation by the client manager module 114(n). Thus, the user of the client device may not even be aware that the update was obtained and installed.

One or more effects of the update on a plurality of health considerations are periodically and automatically monitored, the health considerations including reliability, performance and security (block 506). A determination is then made as to whether an adverse effect is detected (decision block 508). For example, each piece of software installed on a client device may have some effect on the reliability, performance and security of the client device. However, some effects may be acceptable (e.g., minor decrease in performance) while other effects are not, e.g., exposure of vulnerabilities to potential attack. Accordingly, an overall score may be computed which takes into account the plurality of health considerations to determine whether the effect is acceptable or not. For instance, a threshold may be utilized to indicate whether the score for the effect on overall client health is acceptable. The plurality of considerations may be weighted when computing the score. A variety of other techniques may also be utilized to determine whether the effect is acceptable.

In FIG. 5, a determination is made as to whether an adverse effect (e.g., an overall health effect which exceeds the threshold of what is considered "good client health") is detected (decision block 508). If not ("no" from decision block 508), the monitoring is continued (block 506). However, if the adverse effect is detected ("yes" from decision block 508), then the update is removed automatically and without user intervention (block 510) in this example. Thus, the effect of the update on the overall health of the client device may be utilized to determine whether the update should remain. Although a software update was described in this instance, a variety of actions may be monitored, such as effects of a remedy (e.g., a policy) communicated from the client health service 102 as previously described, effect of a newly installed or removed application on the client device 104(n), new or removed hardware on the client device 104, and so on.

Figure 6:
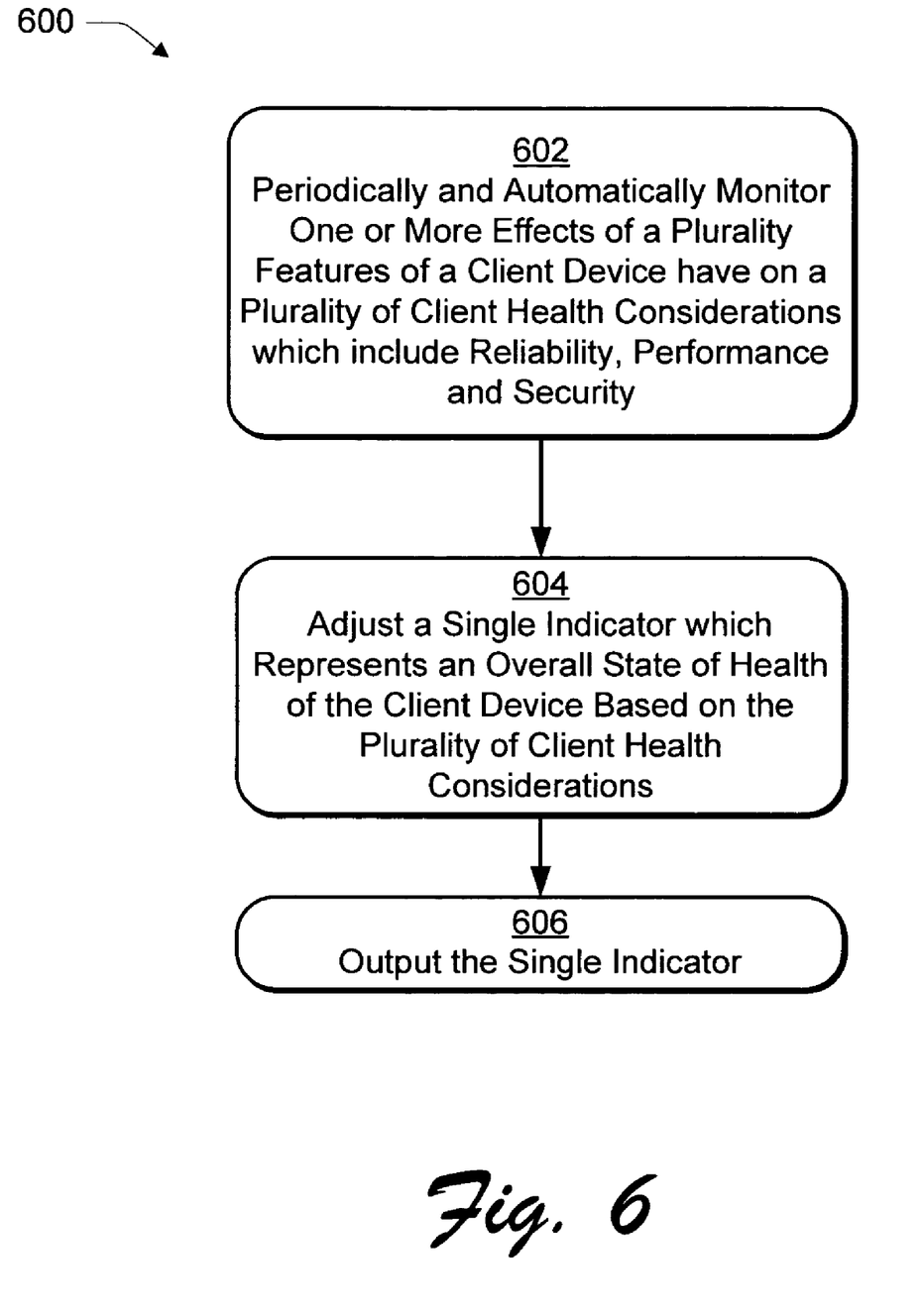
FIG. 6 is a flow diagram depicting a procedure in an exemplary implementation in which a single indication is output which describes the overall health of a client device based on a plurality of client health considerations.

FIG. 6 is a flow diagram depicting a procedure 600 in an exemplary implementation in which a single indication is output which describes the overall health of a client device based on a plurality of client health considerations. One or more effects of a plurality of features of a client device have one a plurality of client health considerations are monitored (block 602). The client health considerations include reliability, performance and security. A single indicator is adjusted which represents an overall state of health of the client device based on the plurality of client health considerations (block 604). For example a color change may be employed, a different indicator output (e.g., a smiley face versus a frowning face), length of a bar adjusted, and so on.

The single indicator is output (block 606) for display and viewing by a user of the client device. Thus, a user of the client device may be informed as to the overall health of the client device without being overwhelmed by details of the plurality of health considerations. In an implementation, the single indictor is selectable to cause an output of the state of each of the plurality of health considerations such that the user may obtain this information if desired.

Exemplary Operating Environment

Figure 7:
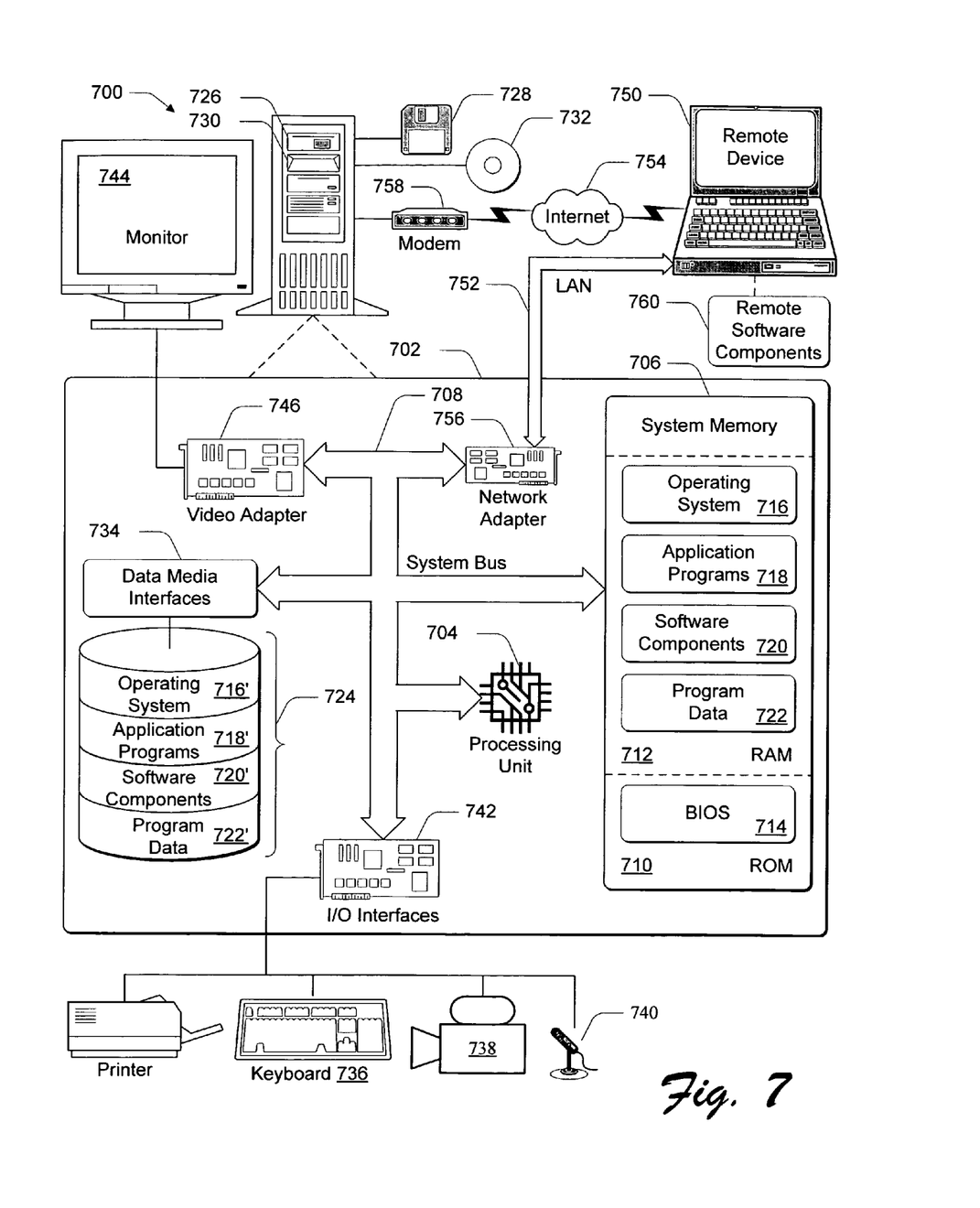
FIG. 7 is an exemplary implementation of a client device in a distributed environment.

The various components and functionality described herein may be implemented with a number of individual computers. FIG. 7 shows components of a typical example of a computer environment 700, including a computer, referred by to reference numeral 702 which may be monitored by the client health system 102 to maintain the health of the computer 702. It should be noted that the computer 702 may be the same as or different from client device 104(n) of FIGS. 1 and 2. The components shown in FIG. 7 are only examples, and are not intended to suggest any limitation as to the scope of the functionality of the invention; the invention is not necessarily dependent on the features shown in FIG. 7.

Generally, various different general purpose or special purpose computing system configurations can be used. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, network-ready devices, minicomputers, mainframe computers, distributed computing environments that include any of the above systems or devices, and the like.

The functionality of the computers is embodied in many cases by computer-executable instructions, such as software components, that are executed by the computers. Generally, software components include routines, programs, objects, components, data structures, etc. that perform particular tasks or implement particular abstract data types. Tasks might also be performed by remote processing devices that are linked through a communications network. In a distributed computing environment, software components may be located in both local and remote computer storage media.

The instructions and/or software components are stored at different times in the various computer-readable media that are either part of the computer or that can be read by the computer. Programs are typically distributed, for example, on floppy disks, CD-ROMs, DVD, or some form of communication media such as a modulated signal. From there, they are installed or loaded into the secondary memory of a computer. At execution, they are loaded at least partially into the computer's primary electronic memory.

For purposes of illustration, programs and other executable program components such as the operating system are illustrated herein as discrete blocks, although it is recognized that such programs and components reside at various times in different storage components of the computer, and are executed by the data processor(s) of the computer.

With reference to FIG. 7, the components of computer 702 may include, but are not limited to, a processing unit 704, a system memory 706, and a system bus 708 that couples various system components including the system memory to the processing unit 704. The system bus 708 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISAA) bus, Video Electronics Standards Association (VESA) local bus, and Peripheral Component Interconnect (PCI) bus also known as the Mezzanine bus.

Computer 702 typically includes a variety of computer-readable media. Computer-readable media can be any available media that can be accessed by computer 702 and includes both volatile and nonvolatile media, removable and non-removable media. By way of example, and not limitation, computer-readable media may comprise computer storage media and communication media. "Computer storage media" includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 702. Communication media typically embodies computer-readable instructions, data structures, program modules or other data in a modulated data signal such as a carrier wave or other transport mechanism and includes any information delivery media. The term "modulated data signal" means a signal that has one or more if its characteristics set or changed in such a manner as to encode information in the signal. By way of example, and not limitation, communication media includes wired media such as a wired network or direct-wired connection and wireless media such as acoustic, RF, infrared and other wireless media. Combinations of any of the above should also be included within the scope of computer readable media.

The system memory 706 includes computer storage media in the form of volatile and/or nonvolatile memory such as read only memory (ROM) 710 and random access memory (RAM) 712. A basic input/output system 714 (BIOS), containing the basic routines that help to transfer information between elements within computer 702, such as during start-up, is typically stored in ROM 710. RAM 712 typically contains data and/or software components that are immediately accessible to and/or presently being operated on by processing unit 704. By way of example, and not limitation, FIG. 7 illustrates operating system 716, application programs 718, software components 720, and program data 722.

The computer 702 may also include other removable/non-removable, volatile/nonvolatile computer storage media. By way of example only, FIG. 7 illustrates a hard disk drive 724 that reads from or writes to non-removable, nonvolatile magnetic media, a magnetic disk drive 726 that reads from or writes to a removable, nonvolatile magnetic disk 728, and an optical disk drive 730 that reads from or writes to a removable, nonvolatile optical disk 732 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 724 is typically connected to the system bus 708 through a non-removable memory interface such as data media interface 734, and magnetic disk drive 726 and optical disk drive 730 are typically connected to the system bus 708 by a removable memory interface.

The drives and their associated computer storage media discussed above and illustrated in FIG. 7 provide storage of computer-readable instructions, data structures, software components, and other data for computer 702. In FIG. 7, for example, hard disk drive 724 is illustrated as storing operating system 716', application programs 718', software components 720', and program data 722'. Note that these components can either be the same as or different from operating system 716, application programs 718, software components 720, and program data 722. Operating system 716', application programs 718', software components 720', and program data 722' are given different numbers here to illustrate that, at a minimum, they are different copies. A user may enter commands and information into the computer 702 through input devices such as a keyboard 736, and pointing device (not shown), commonly referred to as a mouse, trackball, or touch pad. Other input devices may include source peripheral devices (such as a microphone 738 or camera 740 which provide streaming data), joystick, game pad, satellite dish, scanner, or the like. These and other input devices are often connected to the processing unit 702 through an input/output (I/O) interface 742 that is coupled to the system bus, but may be connected by other interface and bus structures, such as a parallel port, game port, or a universal serial bus (USB). A monitor 744 or other type of display device is also connected to the system bus 708 via an interface, such as a video adapter 746. In addition to the monitor 744, computers may also include other peripheral rendering devices (e.g., speakers) and one or more printers, which may be connected through the I/O interface 742.

The computer may operate in a networked environment using logical connections to one or more remote computers, such as a remote device 750. The remote device 750 may be a personal computer, a network-ready device, a server, a router, a network PC, a peer device or other common network node, and typically includes many or all of the elements described above relative to computer 702. The logical connections depicted in FIG. 7 include a local area network (LAN) 752 and a wide area network (WAN) 754. Although the WAN 754 shown in FIG. 7 is the Internet, the WAN 754 may also include other networks. Such networking environments are commonplace in offices, enterprise-wide computer networks, intranets, and the like.

When used in a LAN networking environment, the computer 702 is connected to the LAN 752 through a network interface or adapter 756. When used in a WAN networking environment, the computer 702 typically includes a modem 758 or other means for establishing communications over the Internet 754. The modem 758, which may be internal or external, may be connected to the system bus 708 via the I/O interface 742, or other appropriate mechanism. In a networked environment, program modules depicted relative to the computer 702, or portions thereof, may be stored in the remote device 750. By way of example, and not limitation, FIG. 7 illustrates remote software components 760 as residing on remote device 750. It will be appreciated that the network connections shown are exemplary and other means of establishing a communications link between the computers may be used.

CONCLUSION

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A method comprising:
   collecting heuristic data from a plurality of client devices over a network, wherein:
      the heuristic data describes a plurality of health considerations that include reliability, performance and security of the plurality of client devices; and
      the collecting is performed periodically and automatically without intervention from users of the plurality of client devices;
   generating a remedy corresponding to an issue identified from the heuristic data regarding at least one said health consideration that cures the issue and addresses one or more other said health considerations indicated in the heuristic data, wherein the remedy is proactive for at least one said client device in that the issue has not resulted in a noticeable decrease in overall health of at least one said client device;
   determining an overall health of at least one said client device; and
   outputting a single indication of the overall health of the client device which does not include separate indications of one or more said health considerations, wherein the single indication is selectable to cause an output of one or more said separate indications of the one or more said health considerations.

2. A method as described in claim 1, wherein the generated remedy addresses multiple issues such that the application of the remedy to one said issue also addresses another said issue.

3. A method as described in claim 1, wherein the collecting is performed by receiving the heuristic data pushed over the network by the plurality of client devices to a client health service that performs the collecting and the generating.

4. A method as described in claim 3, further comprising executing a module on each said client device to monitor the plurality of health considerations of the client device to obtain respective said heuristic data.

5. A method as described in claim 1, further comprising applying the remedy to at least one said client device automatically and without intervention by a corresponding said user of the at least one said client device.

6. A method as described in claim 1, wherein the determining is based at least on part on a comparison with the heuristic data collected from the plurality of client devices.

7. A method as described in claim 6, wherein the determining is performed by the at least one said client device.

8. A method comprising:
   identifying an issue with at least one of a plurality of health considerations of a client device, wherein:
      the issue is identified using heuristic data that describes the plurality of health considerations, which include reliability, performance and security; and
      the heuristic data is collected periodically and automatically over a network without intervention from users of a plurality of said client devices;
   generating a remedy corresponding to the identified issue, wherein the remedy is proactive for at least one said client device in that the issue has not resulted in a noticeable decrease in overall health of at least one said client device;
   analyzing an effect of the remedy on the client device regarding the plurality of health considerations generating another remedy based on the analyzing; and monitoring an effect of the other remedy on the client device regarding the plurality of health considerations;
   determining an overall health of at least one said client device; and
   outputting a single indication of the overall health of the client device which does not include separate indications of one or more said health considerations, wherein the single indication is selectable to cause an output of one or more said separate indications of the one or more said health considerations.

9. A method as described in claim 8, wherein the analyzing is based at least on part on a comparison with heuristic data collected from the plurality of said client devices.

10. A method as described in claim 8, further comprising applying the remedy to the client device automatically and without intervention by a user of the client device.

11. A method comprising:

monitoring a plurality of health considerations of a client device which include reliability, performance and security;

determining an overall health of the client device based at least on part on a comparison with heuristic data collected from a plurality of said clients; generating a proactive remedy corresponding to an issue identified from the heuristic data, wherein the remedy is proactive for at least one said client device in that the issue has not resulted in a noticeable decrease in overall health of at least one said client device; applying the remedy to the client device; analyzing an effect of the remedy on the client device regarding the plurality of health considerations; and outputting a single indication of the overall health of the client device which does not include separate indications of one or more said health considerations, wherein the single indication is output for inclusion in a task bar and wherein the single indication is selectable to cause an output of one or more said separate indications of the one or more said health considerations.

12. A method as described in claim 11, wherein the generating and the analyzing are preformed by a client health service over a network that communicatively couples the client device to the client health service.

* * * * *